July 19, 1966    F. G. AUER ETAL    3,261,522
APPARATUS FOR MAKING BUSINESS MACHINE CARDS WITH ROUND CORNERS
Filed April 24, 1964    4 Sheets-Sheet 1
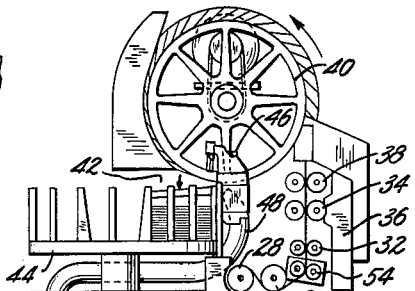
FIG. 1
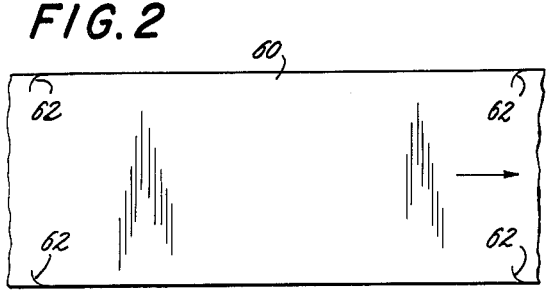
FIG. 2
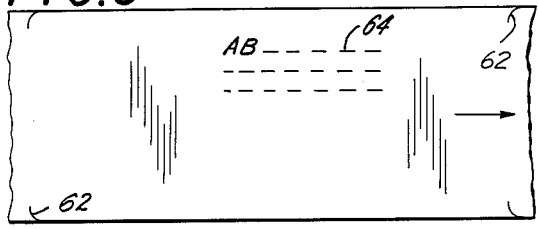
FIG. 3
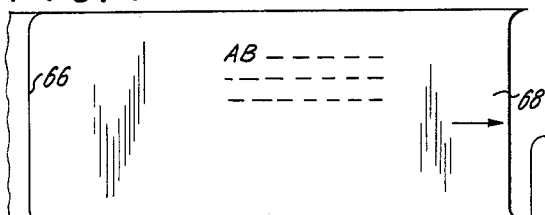
FIG. 4
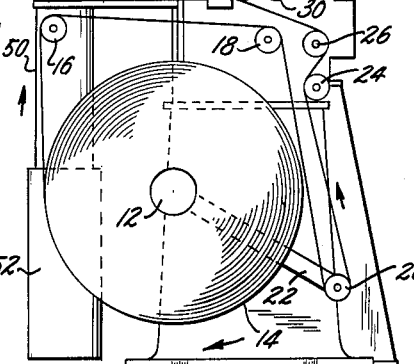
FIG. 7
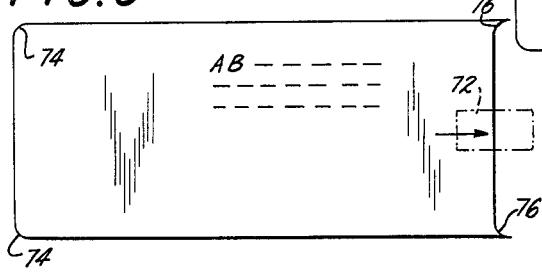
FIG. 5
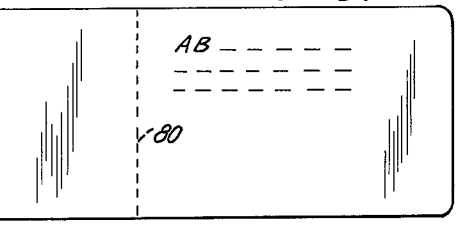
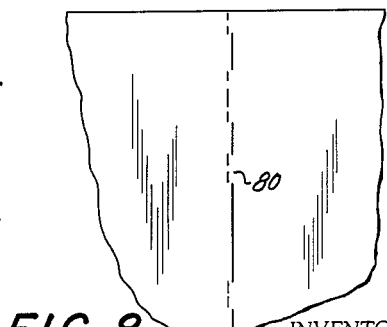
FIG. 6
FIG. 8
INVENTORS
FREDERICK G. AUER
RICHARD E. HOUGHTON
BY James and Franklin
ATTORNEYS INVENTORS
FREDERICK G. AUER
RICHARD E. HOUGHTON
BY James and Franklin
ATTORNEYS July 19, 1966   F. G. AUER ETAL   3,261,522
APPARATUS FOR MAKING BUSINESS MACHINE CARDS WITH ROUND CORNERS
Filed April 24, 1964   4 Sheets-Sheet 3
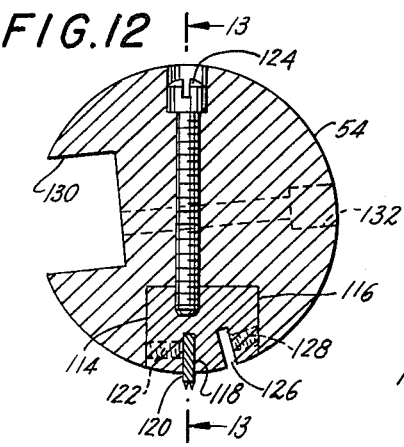
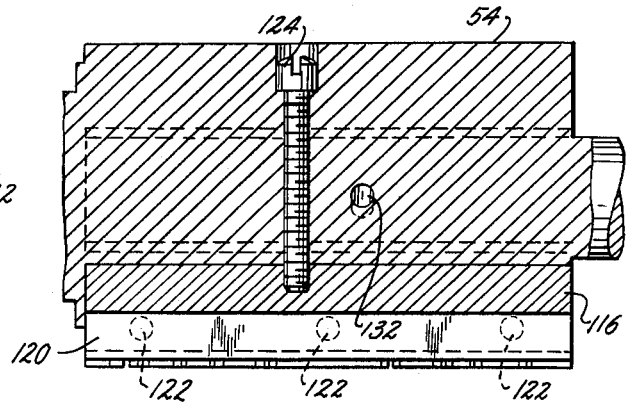
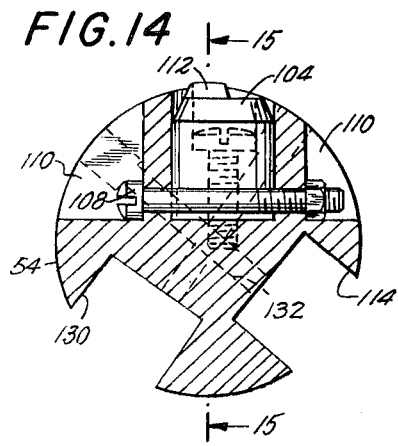
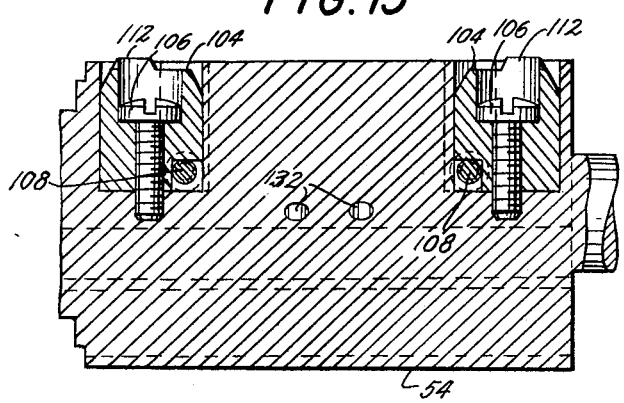
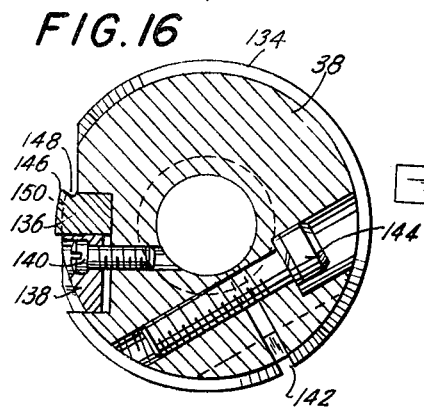
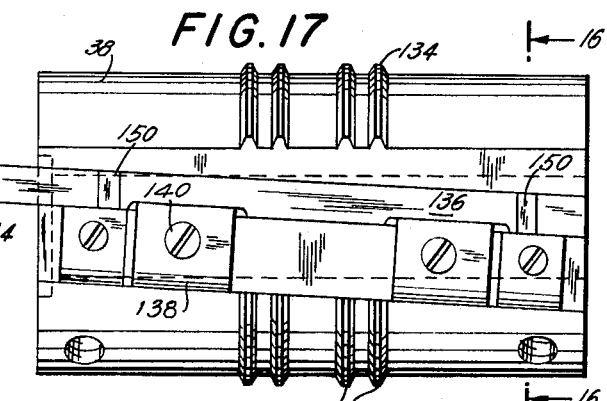
INVENTORS
FREDERICK G. AUER
RICHARD E. HOUGHTON
BY
James and Franklin
ATTORNEYS

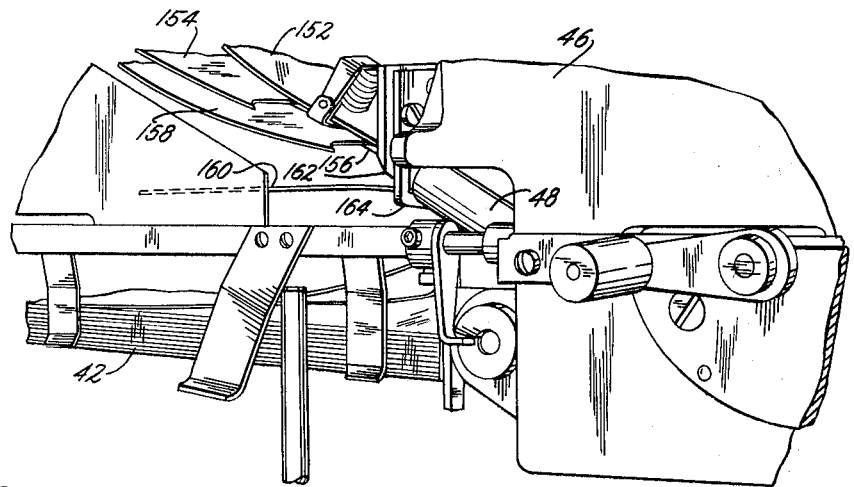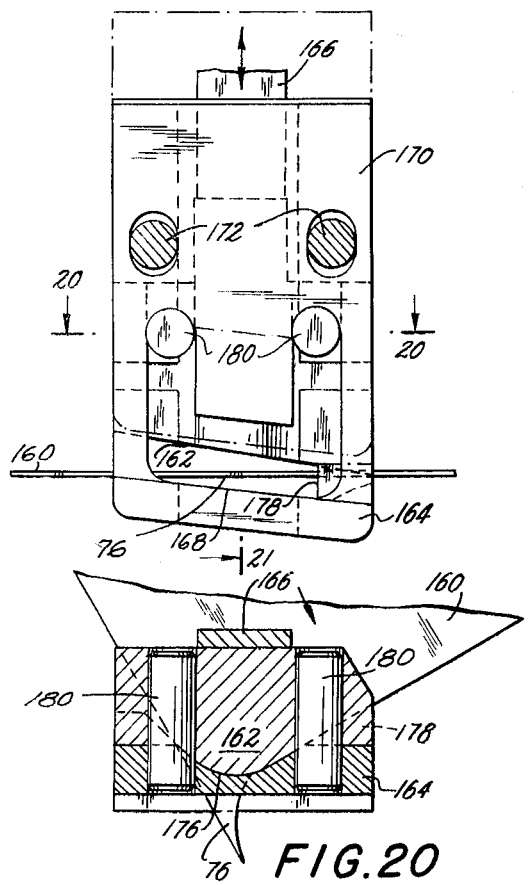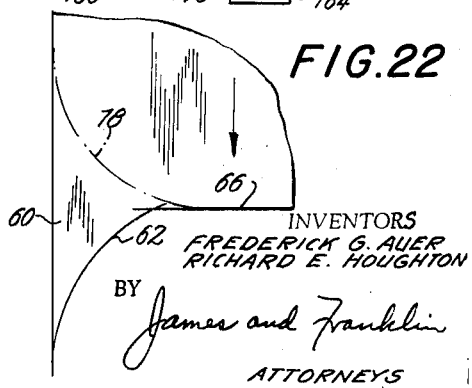

United States Patent Office 3,261,522
Patented July 19, 1966

3,261,522
APPARATUS FOR MAKING BUSINESS MACHINE CARDS WITH ROUND CORNERS
Frederick G. Auer, West Caldwell, and Richard E. Houghton, Rahway, N.J., assignors to Champlain Company, Inc., Roseland, N.J., a corporation of New York
Filed Apr. 24, 1964, Ser. No. 362,290
19 Claims. (Cl. 225—1)

This invention relates to the manufacture of business machine cards with round corners, and more particularly to machines of the type using a transfer wheel for receiving and stacking the cards.

Business machine cards have been made with square corners, although sometimes one corner has been beveled for orientation. Recently cards have been introduced with round corners, to avoid possible difficulty caused by bending of a corner. The general object of the present invention is to provide apparatus for making business machine cards with round corners.

A type of machine already in wide use employs feed rolls and printing element and a rotary severing knife, followed by a transfer wheel with grippers around its periphery for receiving successive cards and for stacking the cards on the opposite side of the wheel. Such machines are sometimes referred to as "Carroll" machines, made originally by The International Business Machines Corporation of New York, New York, and shown in a number of patents, such as Carroll Patent No. 2,294,718; but in recent years these machines have been made by other manufacturers as well. The machine makes the cards with square corners, but some have been provided with means to cut either of the two leading corners with a diagonal cut, when desired by the customer purchasing the cards.

A more specific object of the present invention is to improve machines of the specified type, and more particularly to make it possible to produce round-cornered cards in an advantageous manner in such machines.

Another object is to provide improved mechanism whereby the machine may be operated at higher speed, even when providing a transverse tear line for a detachable stub.

To accomplish the foregoing general objects, and other more specific objects which will hereinafter appear, our invention resides in the machine elements and their relation one to another, as are hereinafter more particularly described in the following specification. The specification is accompanied by drawings in which:

FIG. 1 is an elevation of a machine embodying features of the invention;

FIGS. 2–7 show successive stages in the manufacture of a business machine card made in accordance with the present improvement;

FIG. 8 is a fragmentary view drawn to enlarged scale to show a score cut or tear line which may be provided on the card of FIGS. 2–7;

FIG. 12 is a transverse section through a die-carrying roll with a tear line knife inserted therein;

FIG. 13 is a longitudinal section taken approximately on the line 13—13 of FIG. 12;

FIG. 14 is a transverse section through one of the cutting plugs, with the knife holder of FIG. 12 omitted;

FIG. 15 is a longitudinal section taken approximately on the line 15—15 of FIG. 14;

FIG. 16 is a transverse section through a rotary cutter carrying a shear knife;

FIG. 17 is an elevation of the same;

FIG. 18 is a fragmentary perspective view localized at one of the two reciprocable die carriers, with its adjacent chip tube;

FIG. 19 is a fragmentary elevation drawn to enlarged scale and showing one of two reciprocating dies used before stacking;

FIG. 20 is a fragmentary horizontal section taken approximately on the line 20—20 of FIG. 19;

FIG. 21 is a vertical section taken approximately on the line 21—21 of FIG. 19; and FIG. 22 is a fragmentary view explanatory of the relation of the cuts made by the machine.

Figure 9:
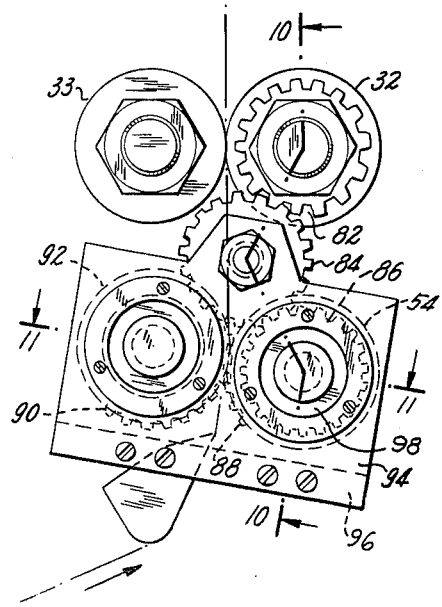
FIG. 9 is an elevation of a roll assembly which is used in the machine of FIG. 1 in lieu of the feed rolls heretofore employed.

Referring to the drawing, and more particularly to FIG. 1, the machine comprises means 12 to support a roll 14 of card paper stock. The paper has the width of a card and is fed around guide rollers 16 and 18 to a tensioning roll 20 carried on a pivoted arm 22, and thence upward around rollers 24, 26, 28, and 30 to feed rollers 32. These feed the web upwardly to a printing cylinder 34, backed by inking rollers and an ink bath which are housed in a movable housing 36. The printing means is followed by a rotary knife 38 which severs an endmost card. There is also a large diameter transfer wheel 40 with grippers around its periphery for receiving successive cards and for stacking the cards at the other side of the wheel, as indicated at 42. The stack is formed between guides mounted on a round table 44. This has additional guides for a number of stacks, and the table may be rotated from time to time to form a new stack. A completed stack may be removed at leisure when turned to an open station remote from the transfer wheel 40.

The machine even as previously made was sometimes provided with reciprocable die-operating means, indicated generally at 46, for diagonally cutting either leading corner of a card held by the transfer wheel 40 just before release of the card for stacking at 42. Each die is provided with a chip tube 48, preferably connected to a scrap bag housed at 50 and subjected to suction by means of a motor and fan housed at 52.

In accordance with the present invention, the machine is additionally provided with arcuate cutting dies at roll 54 to make an arcuate cut at each edge. The rotary knife at 38 is modified or effectively shortened so that it is shorter than the width of the card, and severs the card between the two arcuate cuts. The final die mechanism at 46 is provided with two arcuately shaped dies to provide the card with rounded corners at its leading end, and the resulting scrap is removed by two chip tubes one of which is seen at 48.

Referring next to FIGS. 2–7 of the drawing, the continuous strip 60 is first given an arcuate cut 62 at each edge, and these cuts point in the direction of travel of the web 60. The card is next printed, as indicated at 64 in FIG. 3. The endmost card is then severed by a cross cut indicated at 66 in FIG. 4. The endmost card then is moved away from the next succeeding card, which ensures its separation. Thus, in FIG. 4 the card 68 is being pushed from the card 70 to the transfer wheel (40 in FIG. 1), one of the peripheral grippers of which is schematically suggested in broken lines at 72 in FIG. 5, the transfer wheel and its grippers being much narrower than the card. As shown in FIG. 5, the severed card then has rounded corners 74 at its trailing end, and points 76 at its leading end.

The transfer wheel receives successive cards and moves them slowly, until after turning about three-fourths of a revolution, the card is near the bottom of the wheel, at which time the corner points 76 reach and are moved into the reciprocable dies, indicated at 46 in FIG. 1.

These are arcuately shaped and form rounded corners at the leading end of the card, as indicated at 78 in FIG. 6. The scrap or chips are safely removed by two suction pipes, one of which is shown at 48 in FIG. 1. The finished card then has four rounded corners, as shown in FIG. 7.

In some cases the card is provided with a removable section or stub, and for this purpose a tear line may be provided across the card. Such a line is suggested at 80 in FIG. 7, and in its preferred form is made up of staggered cuts on two lines which are very slightly displaced from one another, as shown to larger scale at 80 in FIG. 8. When such a tear line is to be provided, it is preferably made during the first operation, shown in FIG. 2, that is, along with the formation of the initial arcuate cuts 62.

Reverting to FIG. 1, it will be recalled that a rolling cutter is added at 54, preceding the feed rolls 32. The drive may be described with reference to FIGS. 9, 10, and 11 of the drawing. In FIG. 9 the feed rolls are shown at 32, 33. Roll 33 may be left unchanged, but roll 32 is replaced by a roll which is extended to carry a drive gear 82. This meshes with an idler gear 84, which in turn meshes with a gear 86 secured on the shaft of a score cutter roll 54. The latter also carries a gear 88 having a pitch diameter matching that of the score cutter. This gear meshes with a similar gear 90, which is mounted on and drives an anvil roll 92 which cooperates with the cutter roll 54. The drive gears 82, 84, and 86 are preferably equal in diameter, in which case the cutter rolls 54, 92 rotate in unison and at the same speed as the feed rollers 32, 33.

The drive of feed roller 32 need not be described in detail, it being the regular drive heretofore employed, and utilizing gearing not shown here but housed in the enclosed head of the machine behind the rolls here illustrated. The feed roller 33 is driven in one-to-one ratio with the feed roller 32 by means of pitch diameter gears which are not shown because they too are housed in the machine and are the same gears that were heretofore used as a regular part of the machine. The conventional gearing referred to also drives (reverting to FIG. 1) the printing rollers 34, the rotary shear knives 38, the transfer wheel 40, and the vertically reciprocable dies at 46.

Figure 10:
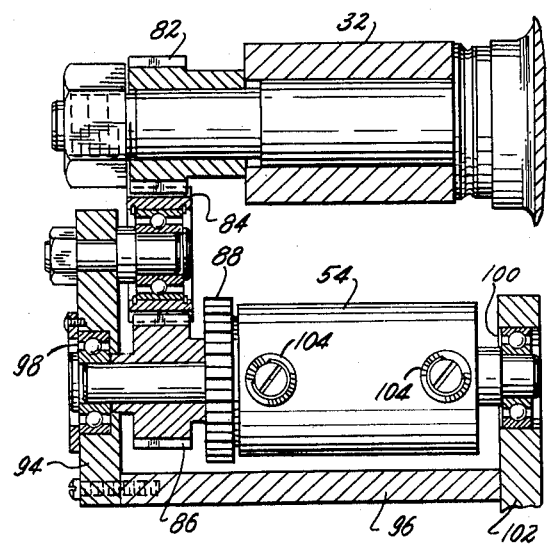
FIG. 10 is a section taken approximately in the plane of the line 10—10 of FIG. 9.
Figure 11:
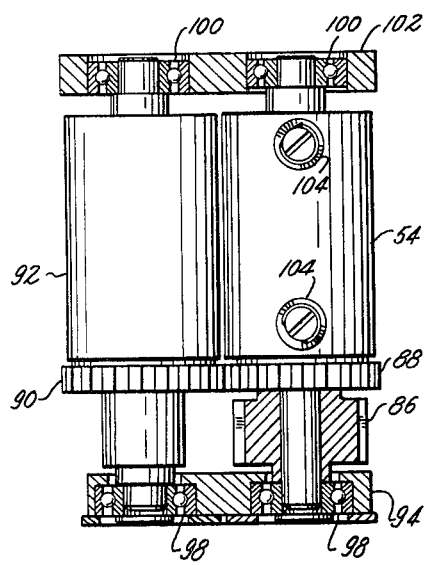
FIG. 11 is a section taken approximately in the plane of the line 11—11 of FIG. 9.

As heretofore made the rolls were overhung, there being no bearings at their outer ends. In FIGS. 9–11 it will be seen that the cutter roll 54 and its anvil roll 92 are supported by an outside bearing plate 94 secured to the frame by bracket 96. The bearing plate 94 carries ball bearings 98 for the outer ends, as well as bearings 100 for the inner ends of the roll shafts, the bearings 100 being carried in a bearing plate 102 which is mounted directly on the frame of the machine.

In FIGS. 10 and 11, it will be seen that cutter roll 54 carries cutting plugs 104. These may be described in greater detail with reference to FIGS. 14 and 15, in which the roll 54 has cylindrical sockets to receive plugs 104, these being held by screws 106. The orientation of the plug is fixed by means of transverse bolts 108, and the roll 54 is recessed at 110 to provide clearance for the ends of bolts 108. The cutting edge of plugs 104 is shown at 112. It is arcuate and may be 90° in length, but for a reason later explained it is preferably limited to about 80° in length. The spacing and the orientation of the plugs is appropriate to provide the arcuate cuts indicated at 62 in FIG. 2. Dowel pins may be used instead of the bolts 108 in FIG. 14.

The cutting edges 112 work against the anvil roll shown at 92 in FIGS. 9 and 11. The cutting plugs do not touch the anvil cylinder, and have a clearance of say two ten-thousandths of an inch, thereby producing a so-called "burst cut." Such a burst cut may be employed even though a few fibers may remain uncut, because of the positive separation of the endmost card from the next succeeding card. The anvil roll may be a hard rather than a soft roll, but the latter, for example Phosphor bronze, has the advantage of not damaging the knife edge if carelessly adjusted. The adjustment may be by means of shims beneath the plugs.

It was previously mentioned that if a tear line is to be produced across the card, it is preferably produced at the same cutting station. This may be explained with reference to FIGS. 12 and 13, in which it will be seen that the roll 54 is longitudinally slotted to provide a seat 114 dimensioned to receive a knife holder 116, which in turn is slotted at 118 to receive knife 120. The knife is locked in holder 116 by a series of set screws 122, and the knife holder 116 is locked in its slot by means of a screw 124 which passes diametrically through the roll 54 and is threadedly received in holder 116.

In FIG. 12 it will be seen that knife holder 116 has a second knife-receiving slot 126 and threaded holes 128 for set screws, so that the knife 120 may be secured in either slot. Moreover, the roll 54 is preferably provided with an additional large channel 130 to receive the knife holder 116, in which case the holder is locked in position by a diametrical screw, like screw 124 but passing through a mating hole provided at 132. In this way, the card may be scored about one-third of its length from either end, and in either of two positions at either end.

There is no interference between the parts used for the corner cuts and the parts used for the tear line. By reference to FIG. 14, it will be seen that the plugs are located in the solid part of the roll intermediate the channels 114 and 130. Also, by comparison of FIGS. 13 and 15 it will be seen that the screw 124 and passage 132 are located near the center of the roll, and therefore clear the plugs which are located near the ends of the roll.

Different forms of tear line may be employed, but that here shown in FIG. 8 uses score cuts alternately displaced slightly, and it is for that reason that the score knife 120 shown in FIG. 12 has two closely adjacent cutting edges. The tear line retains more than adequate strength for the separation of the endmost card from the next succeeding card previously described.

The rotary shear knife indicated generally at 38 in FIG. 1 is shown in detail in FIGS. 16 and 17. Roll 38 is reduced in diameter but has raised rings 134 for some guiding engagement with the printed web without smudging the print. The roll is channeled to receive a knife 136, which is locked in position by means of a clamp strip 138 drawn inward by screws 140. The roll 38 is split at 142 and clamped to its shaft by means of clamp screws 144. The cutting edge of knife 136 is at 146, and an adjacent groove is formed at 148 which receives and bears against the trailing edge of the severed card to push its leading end upward into the next gripper of the transfer wheel (40 in FIG. 1).

In most respects the shear cutter is like that previously used, including its bias mounting and its shear cooperation with the opposed mating rotary knife, and including further the action of groove 148 with its hook-like engagement of the severed end of the card to separate it from the next card and to feed it upwards into the transfer wheel. However, the knife 136 differs importantly from that previously used in being effectively shortened so that it does not cut all the way across the card. FIGS. 4–6 show how the cross-cut extends between the arcuate cuts, and may even have a slight excess length, but is substantially shorter than the width of the card, so that no loose scrap or chip is formed which would prove most troublesome at this part of the machine.

The cuts are shown to larger scale in FIG. 22, and it will be seen there that the cross-cut 66 safely reaches and intersects the arcuate cut 62, but that the end of cut 66 is well within the edge of web 60.

In lieu of physically shortening the knife 136, it is preferred to recess or notch it, as indicated at 150 in FIG. 17. The inner edges of the notches define the length of the cut, and the outer edges of the notches are located outside the edges of the web. Thus, the cutting length of the knife is effectively shortened, but the full length of the knife is retained for secure mounting in the roll 38.

The mating shear roll (not shown except in FIG. 1) has a mating shear knife, but may differ in not having a hook to raise the card, and in not needing the raised beads (134 in FIG. 17).

As so far described, the card is in the condition shown in FIG. 5. It will be recalled that the leading corners are rounded by cuts 78 shown in FIG. 6, and produced by vertically reciprocable dies located at 46 in FIG. 1. This part of the machine is shown in perspective and to larger scale in FIG. 18 of the drawing. The cards being stacked are shown at 42. One of the grippers of the transfer wheel is shown at 152 holding a card 154; a preceding gripper is shown at 156 holding a card 158; and a still earlier gripper (not visible) is holding a card 160. The corner of card 160 is beneath a stationary die 162, and above the cutting edge of an upwardly movable die 164, the latter being moved from above. FIG. 18 also shows the upper end of the chip tube 48 which is located immediately adjacent the cutting dies 162, 164. When die 164 rises it cuts away the pointed corner of the card, and a similar die at the opposite side of the transfer wheel cuts away the other pointed corner of the card. Both chips are safely sucked away through two like chip tubes 48. Immediately on operation of the dies, the card 160 is released and falls onto the stack 42.

The vertically reciprocating die is shown in greater detail in FIGS. 19, 20 and 21, referring to which the stationary die 162 is carried at the lower end of an upright fixed support 166. The movable die 164 has a generally U-shaped slot or window above its cutting edge 168. Its upper end 170 is secured by means of screws 172 to the lower end of a vertically reciprocable member 174, which is driven by the mechanism of the machine. This mechanism is not new and need not be described in detail, but usually a die was used at only one corner or the other, to bevel one corner or the other for orientation purpose. Both mechanisms were provided, and both corners could be bevelled if so desired. In the present case, as will be seen particularly in FIGS. 20 and 21, the movable die 164 has a concave cutting edge, and the stationary die 162 has a mating convex cutting edge, these being indicated at 176.

It will be understood that when the movable die 164 is in its lowered position, ample clearance is provided between the dies for passage of the pointed corners of the card therebetween as shown in FIGS. 20 and 21, in which the point 76 of card 160 has moved through the lower part of the U-shaped slots or window formed in die 164. The forward motion of the card is positively limited by depending fixed stops 178 formed at the lower end of the stationary die 162. The stops on the two corner dies locate the card with precision as it receives its final cut. The raised position of the movable die is suggested in broken lines in FIG. 21, which also shows how the die action raises the chip from the solid line position 76 to the broken line position 76'. The broken lines 160' suggest the release of the card 160 to its stack.

In FIGS. 19 and 20 there are fixed guide pins 180 projecting from the fixed die 162 and received in the vertical slots (the upright arms of the U-shaped slot) in the movable die 164. These help guide the motion of one die relative to the other, in addition to the mating of the convex and concave portions shown at 176 in FIG. 20.

Referring now to FIG. 22, the initial arcuate cut 62 preferably terminates at a length of 80° instead of 90°. This ensures that the end of arcuate cut 62 will not extend beyond the second cut indicated in broken lines at 78. There is a slight permitted tolerance in the length of the card, that is, in the position of the cross-cut 66. The 80° cut 62 is adequate to ensure intersection of the cuts 62 and 66, which is all that is required for easy separation of the cards. The final cut 78 may be a full 90° cut, and is accurately located with respect to the edge of the card at 66 by reason of the action of the depending stops 178 (FIGS. 19–21) against which the card is moved just prior to operation of the reciprocating die which forms the corner cut 78.

It is believed that the construction and operation of the improved machine for making business machine cards with round corners, as well as the advantages thereof, will be apparent from the foregoing detailed description. It will be understood that to notch out a small triangular chip would be troublesome when using rolling cutters, because residual fibers would tend to hold the chip, and special chip-removing means would be needed. With the present arrangement it does not matter if there are residual fibers at the first cut because the subsequent shear cut across the card is followed by a positive separation of the leading card from the web, the leading card being pushed from the web by the shear cut blade itself, as previously explained. The final corner cut is performed in reciprocable dies which have no problem of residual fibers. Moreover, chip tubes then are available for removal of the triangular pieces by suction.

Heretofore the cut-score line for providing a tear line limited the operating speed of the machine to about 800 r.p.m. The new rolls here provided with their double frame bearings make it possible to operate the machine at a speed of about 1300 r.p.m., even with a cut-score line. The overhung feed rolls 32 now function merely as feed rolls, and they are not used for a score cut. The new rolls which now are used for score cutting are not overhung, and therefore operate successfully at much higher speed.

It will be apparent that while we have shown and described the machine in a preferred form, changes may be made without departing from the scope of the invention as sought to be defined in the following claims.

We claim:

1. In the manufacture of round cornered business machine cards from a continuous strip of paper, the method which includes making an arcuate cut at each edge, severing the endmost card by a cross-cut between the arcuate cuts, moving the endmost card away from the next succeeding card to ensure its separation, the severed card then having rounded corners at one end and points at its other end, and arcuately cutting the points from the card to form rounded corners.

2. In the manufacture of round cornered business machine cards from a continuous strip of paper, the method which includes making an arcuate cut at each edge with said cuts pointing in the direction of travel of the paper, severing the endmost card by a cross-cut between the arcuate cuts, moving the endmost card away from the next succeeding card to ensure its separation, the severed card then having rounded corners at its trailing end and points at its forward end, feeding the severed card points foremost into arcuate corner cutting means, and there forming rounded corners at the leading end of the card.

3. Apparatus for the manufacture of round cornered business machine cards from a continuous strip of paper, comprising means to make an arcuate cut at each edge, means to sever the endmost card by making a cross-cut between the arcuate cuts, means to move the endmost card away from the next succeeding card to ensure separation, the severed card then having rounded corners at one end and points at its other end, and means to arcuately cut the points from the card to form rounded corners.

4. Apparatus for the manufacture of round cornered business machine cards from a continuous strip of paper, comprising means to make an arcuate cut at each edge with the cuts pointing in the direction of travel of the paper, means to sever the endmost card by making a cross-cut between the arcuate cuts, means to move the endmost card away from the next succeeding card to ensure separation, the severed card then having rounded corners at its trailing end and points at its forward end, and means to feed the severed card points foremost into arcuate corner cutting means, said latter means forming rounded corners at the leading end of the card.

5. A machine for making business machine cards from a roll of paper stock, said machine comprising feed rolls, arcuate cutting dies to make an arcuate cut at each edge with the said cuts pointing in the direction of travel of the paper, a severing blade to sever the card, a transfer wheel with grippers around its periphery for receiving successive cards and for stacking the cards, die operating means at the leading corners of a card held by the transfer wheel, and arcuately shaped dies in said die operating means to cut off the corners with an arcuate cut which provides rounded corners at the leading end of the card.

6. A machine for making business machine cards from a roll of paper stock, said machine comprising feed rolls, arcuate cutting dies to make an arcuate cut at each edge with the said cuts pointing in the direction of travel of the paper, a severing blade shorter than the width of the card to sever the card between the arcuate cuts, a transfer wheel with grippers around its periphery for receiving successive cards and for stacking the cards, reciprocable die operating means at the leading corners of the card held by the transfer wheel just before release of the card for stacking, arcuately shaped dies in said reciprocable die operating means to cut off the corners with an arcuate cut which provides rounded corners at the leading end of the card, and chip tubes with suction means at said dies.

7. The combination with a machine for making business machine cards, said machine comprising means to support a roll of card paper stock, feed rolls, a rotary knife carrier for severing an endmost card, a large diameter transfer wheel with grippers around its periphery for receiving successive cards and for stacking the cards, reciprocable die operating means intended to receive a die for diagonally cutting either leading corner of a card held by the transfer wheel just before release for stacking, and chip tubes with suction means at said die operating means, of the following additional elements for providing round corners; arcuate cutting dies to make an arcuate cut at each edge with the said cuts pointing in the direction of travel of the paper, and two arcuately shaped dies in said reciprocable die operating means to cut off the corners with an arcuate cut which provides rounded corners at the leading end of the card, the resulting scrap being removed by said chip tubes.

8. The combination with a machine for making business machine cards, said machine comprising means to support a roll of card paper stock, feed rolls, a knife carrier for severing an endmost card, a transfer wheel with grippers around its periphery for receiving successive cards and for stacking the cards, die operating means intended to receive a die for diagonally cutting either leading corner of a card held by the transfer wheel, and chip tubes with the suction means at said die operating means, of the following additional elements for providing round corners; arcuate cutting dies to make an arcuate cut at each edge with the said cuts pointing in the direction of travel of the paper, a severing blade in the aforesaid knife carrier which blade is shorter than the width of the card in order to sever the card between the arcuate cuts, whereby the cards in the transfer wheel have points at the two leading corners and are rounded at the two trailing corners, and two arcuately shaped dies in said die operating means to cut off the corners with an arcuate cut which provides rounded corners at the leading end of the card, the resulting scrap being removed by said chip tubes.

9. In a machine for making business machine cards, of the type comprising means to support a roll of card paper stock, feed rolls, print means, a rotary knife carrier for severing an endmost card, a larger diameter transfer wheel with grippers around its periphery for receiving successive cards for stacking the cards, reciprocable die operating means intended to receive a die for diagonally cutting either leading corner of a card held by the transfer wheel just before release for stacking, and chip tubes with suction means at said die operating means, characterized by the addition of the following additional elements for providing round corners; arcuate cutting dies to make an arcuate cut at each edge with the said cuts pointing in the direction of travel of the paper, a severing blade in the aforesaid rotary knife carrier which blade is shorter than the width of the card in order to sever the card between the arcuate cuts, whereby the cards in the transfer wheel have points at the two leading corners and are rounded at the two trailing corners, and two arcuately shaped dies in said reciprocable die operating means to cut off the corners with an arcuate cut which provides rounded corners at the leading end of the card, the resulting scrap being removed by said chip tubes.

10. A machine as defined in claim 5, in which the first arcuate cut is limited to about 80° of arc.

11. A machine as defined in claim 9, in which the first arcuate cut is limited to about 80° of arc.

12. A machine as defined in claim 5, in which the arcuate cutting dies are carried by a score cutter roller working against an anvil roller, and in which the cutting dies are adjusted for a burst cut.

13. A machine as defined in claim 9, in which the arcuate cutting dies are carried by a score cutter roller working against an anvil roller, and in which the cutting dies are adjusted for a burst cut.

14. A machine as defined in claim 5, in which the arcuate cutting dies are carried by a score cutter roller working against an anvil roller, and in which the die-carrying roll has one or more longitudinal slots acting as seats to receive a scoring knife holder when the cards are to be provided with a transverse tear line.

15. A machine as defined in claim 9, in which the arcuate cutting dies are carried by a score cutter roller working against an anvil roller, and in which the die-carrying roll has one or more longitudinal slots acting as seats to receive a scoring knife holder when the cards are to be provided with a transverse tear line.

16. A machine as defined in claim 5, in which the arcuate cutting dies are carried by a score cutter roller working against an anvil roller, and in which the rollers are adjusted for a burst cut, and in which the die-carrying roll has one or more longitudinal slots acting as seats to receive a scoring knife holder when the cards are to be provided with a transverse tear line, and in which the said die and anvil rollers are carried by substantial bearings at both ends of the rollers.

17. A machine as defined in claim 9, in which the arcuate cutting dies are carried by a score cutter roller working against an anvil roller, and in which the rollers are adjusted for a burst cut, and in which the die-carrying roll has one or more longitudinal slots acting as seats to receive a scoring knife holder when the cards are to be provided with a transverse tear line, and in which the said die and anvil rollers are carried by substantial bearings at both ends of the rollers.

18. A machine as defined in claim 5, in which the arcuate cutting dies are carried by a score cutter roller working against an anvil roller, and in which the rollers are adjusted for a burst cut, and in which the arcuate cut is limited to about 80° of arc, and in which the die-carrying roll has one or more longitudinal slots acting as seats to receive a scoring knife holder when the cards are to be provided with a transverse tear line, and in which the said die and anvil rollers are carried by substantial bearings at both ends of the rollers.

19. A machine as defined in claim 9, in which the arcuate cutting dies are carried by a score cutter roller working against an anvil roller, and in which the rollers are adjusted for a burst cut, and in which the arcuate cut is limited to about 80° of arc, and in which the die-carrying roll has one or more longitudinal slots acting as seats to receive a scoring knife holder when the cards are to be provided with a transverse score line, and in which the said die and anvil rollers are carried by substantial bearings at both ends of the rollers.

References Cited by the Examiner

UNITED STATES PATENTS

| | | | |
|---|---|---|---|
| 1,067,626 | 7/1913 | Smith | 83—300 X |
| 1,289,084 | 12/1918 | Banzett | 83—300 |
| 2,181,935 | 12/1939 | Carroll | 101—227 |
| 2,311,692 | 2/1943 | Potdevin | 83—300 X |
| 2,992,581 | 7/1961 | Friesz | 83—668 X |
| 3,198,048 | 8/1965 | Finlayson et al. | 83—667 X |

WILLIAM W. DYER, JR., *Primary Examiner.*

J. M. MEISTER, *Assistant Examiner.*